(12) United States Patent
Levitt

(10) Patent No.: US 9,895,635 B2
(45) Date of Patent: Feb. 20, 2018

(54) FLUID FILTRATION AND PARTICLE CONCENTRATION DEVICE AND METHODS

(71) Applicant: Spiral Water Technologies, Inc., San Rafael, CA (US)

(72) Inventor: David J. Levitt, San Anselmo, CA (US)

(73) Assignee: Spiral Water Technologies, Inc., San Anselmo, CA (US)

( * ) Notice: Subject to any disclaimer, the term of this patent is extended or adjusted under 35 U.S.C. 154(b) by 0 days.

(21) Appl. No.: 15/200,510

(22) Filed: Jul. 1, 2016

(65) Prior Publication Data

US 2016/0310877 A1    Oct. 27, 2016

Related U.S. Application Data

(63) Continuation of application No. 13/045,349, filed on Mar. 10, 2011, now Pat. No. 9,409,106.
(Continued)

(51) Int. Cl.
*B01D 29/64*   (2006.01)
*B01D 46/24*   (2006.01)
(Continued)

(52) U.S. Cl.
CPC ........ *B01D 29/6476* (2013.01); *B01D 29/117* (2013.01); *B01D 29/23* (2013.01); *B01D 29/601* (2013.01); *B01D 29/606* (2013.01); *B01D 29/6415* (2013.01); *B01D 29/906* (2013.01); *B01D 46/0041* (2013.01); *B01D 46/0043* (2013.01); *B01D 46/0065* (2013.01);
(Continued)

(58) Field of Classification Search
CPC .. B01D 29/6476; B01D 29/23; B01D 29/601; B01D 29/606; B01D 29/6415; B01D 46/0041; B01D 46/0065; B01D 46/2403; B01D 46/442; B01D 46/446; B01D 63/06
USPC ......................................................... 210/741
See application file for complete search history.

(56) References Cited

U.S. PATENT DOCUMENTS 3,272,336 A    9/1966   Humbert
3,280,980 A    10/1966  King
(Continued)

FOREIGN PATENT DOCUMENTS

CN    2194753 Y    4/1995
CN    101351254    1/2009
(Continued)

OTHER PUBLICATIONS

Russell Finex Inc., "The Self-Cleaning Russell Eco Filter" Brochure, 2 pages.
(Continued)

*Primary Examiner* — Robert Clemente
*Assistant Examiner* — Akash Varma
(74) *Attorney, Agent, or Firm* — Knobbe, Martens, Olson & Bear, LLP

(57) ABSTRACT

Fluid filtration devices and methods of filtering fluids are described. The devices generally include a housing and an annular filter assembly, wherein the filter assembly is located inside the housing and comprises a filter material. The filter material may be, for example, an electroformed nickel screen having a smooth working surface and expanding pores. A rotating cleaning assembly comprising a distributor and wipers may be located inside the filter assembly.

11 Claims, 13 Drawing Sheets

Related U.S. Application Data

(60) Provisional application No. 61/340,072, filed on Mar. 12, 2010.

(51) Int. Cl.
    B01D 63/06   (2006.01)
    B01D 65/02   (2006.01)
    B01D 29/11   (2006.01)
    B01D 29/90   (2006.01)
    B01D 46/00   (2006.01)
    B01D 29/23   (2006.01)
    B01D 29/60   (2006.01)
    B01D 46/44   (2006.01)

(52) U.S. Cl.
    CPC ....... B01D 46/2403 (2013.01); B01D 46/442 (2013.01); B01D 46/446 (2013.01); B01D 63/06 (2013.01); B01D 65/02 (2013.01); B01D 2201/184 (2013.01); B01D 2313/48 (2013.01); B01D 2321/2041 (2013.01); B01D 2321/30 (2013.01)

(56) References Cited

U.S. PATENT DOCUMENTS

| | | |
|---|---|---|
| 3,280,981 A | 10/1966 | Renfrew |
| 3,688,339 A | 9/1972 | Vincent et al. |
| 3,959,140 A | 5/1976 | Legras |
| 3,997,441 A | 12/1976 | Pamplin, Jr. |
| 4,075,095 A | 2/1978 | Parnaby |
| 4,085,050 A * | 4/1978 | Gervasi .................. B01D 29/25 210/332 |
| 4,257,890 A | 3/1981 | Hurner |
| 4,267,039 A | 5/1981 | Ryan |
| 4,664,682 A | 5/1987 | Monzen |
| 4,806,217 A | 2/1989 | Rosenberg |
| 4,931,180 A | 6/1990 | Darchambeau |
| 5,087,365 A | 2/1992 | Davis et al. |
| 5,108,592 A | 4/1992 | Wilkins et al. |
| 5,183,568 A | 2/1993 | Lescovich |
| 5,198,111 A | 3/1993 | Davis |
| 5,332,499 A | 7/1994 | Spencer |
| 5,401,396 A | 3/1995 | Lescovich et al. |
| 5,443,726 A | 8/1995 | Steiner et al. |
| 5,520,805 A | 5/1996 | Majola |
| 5,575,911 A | 11/1996 | Rosenberg |
| 5,595,655 A | 1/1997 | Steiner et al. |
| 5,707,518 A | 1/1998 | Coates et al. |
| 5,820,762 A | 10/1998 | Bamer et al. |
| 6,177,022 B1 | 1/2001 | Benenson, Jr. et al. |
| 6,200,467 B1 * | 3/2001 | Nagaoka ................. B01D 29/15 210/136 |
| 6,387,261 B1 | 5/2002 | Mojena |
| 6,517,722 B1 | 2/2003 | Benenson, Jr. et al. |
| 6,666,976 B2 | 12/2003 | Benenson, Jr. et al. |
| 6,676,834 B1 | 1/2004 | Benenson, Jr. et al. |
| 6,712,981 B2 | 3/2004 | Benenson, Jr. et al. |
| 6,758,874 B1 | 7/2004 | Hunter, Jr. |
| 6,821,444 B2 | 11/2004 | Benenson, Jr. et al. |
| 6,861,004 B2 | 3/2005 | Benenson, Jr. et al. |
| 7,070,636 B2 | 7/2006 | McCormick et al. |
| 7,083,735 B2 | 8/2006 | Laing |
| 7,323,105 B1 | 1/2008 | Janikowski et al. |
| 7,351,269 B2 | 4/2008 | Yau |
| 7,632,416 B2 | 12/2009 | Levitt |
| 7,918,347 B2 | 4/2011 | Geisbauer |
| 2003/0006187 A1 | 1/2003 | Frey |
| 2003/0136738 A1 | 7/2003 | Kim et al. |
| 2004/0007195 A1 | 1/2004 | Grewal et al. |
| 2007/0039900 A1 * | 2/2007 | Levitt ................. B01D 21/0003 210/787 |
| 2007/0181156 A1 | 8/2007 | Uz et al. |
| 2008/0197077 A1 | 8/2008 | Swartley et al. |
| 2010/0096310 A1 | 4/2010 | Yoshida |
| 2011/0173939 A1 | 7/2011 | Gerlach et al. |
| 2011/0220586 A1 | 9/2011 | Levitt |
| 2012/0318295 A1 | 12/2012 | Delgado et al. |
| 2015/0196859 A1 | 7/2015 | Levitt |

FOREIGN PATENT DOCUMENTS

| | | |
|---|---|---|
| CN | 201346418 | 11/2009 |
| CN | 101636213 | 1/2010 |
| DE | 40 17 216 | 12/1991 |
| EP | 0 318 361 | 5/1989 |
| EP | 2 082 793 | 7/2009 |
| EP | 2 138 218 | 12/2009 |
| JP | 08-155279 | 6/1996 |
| JP | 08-229366 | 9/1996 |
| JP | 2004-255442 | 9/2004 |
| KR | 10-1997-0061308 | 9/1997 |
| KR | 20-2007-0000262 | 3/2007 |
| WO | WO 90/04443 | 5/1990 |
| WO | WO 96/18791 | 6/1996 |
| WO | WO 2007062643 | 6/2007 |

OTHER PUBLICATIONS

Agnew, Mechanical Self-Cleaning Filtration, Say You Saw It in Filtration News, Sep./Oct. 1997, pp. 30.

Allhands, Amiad's Suction Scanning System, Amiad Filtration Systems, pp. 1-2.

Holdich et al., Pore design and engineering for filters and membranes, Phil. Trans. R. Soc. A, 2006, vol. 364, pp. 161-174.

Kuiper, Development and application of microsieves, Micromechanical Transducers Group of the MESA research institute, University of Twente, 2000, pp. 1-133, Enschede, The Netherlands.

Magnetically Coupled Filter, MCF 824-Series, Eaton Powering Business Worldwide, pp. 1-2.

Metaledge, Self-Cleaning Filters, Purolator Facet, Inc.

Ronningen-Petter, Solutions for Clean in Place (CIP) loop filtration, pp. 1-2.

Ronningen-PetterTM DCF-800 Twin, Mechanically Cleaned Filter System, RPA Process Technologies, 2002, pp. 1-2.

The CFT TurbocloneTM Technology, Clean Filtration Technologies, Inc., 2006-2009, pp. 1-5.

International Search Report and Written Opinion in Application No. PCT/US2011/027996 dated Nov. 21, 2011.

Extended European Search Report dated Jul. 26, 2013 in Application No. 11754117.7.

Office Action dated Mar. 27, 2014 in Chinese Application No. 201180023733.1 with English Translation.

Office Action dated Nov. 15, 2014 in Chinese Application No. 201180023733.1 with English Translation.

European Office Action dated Jun. 3, 2015 in European Application No. 11754117.7.

Israeli Office Action dated Jun. 23, 2015 in Israeli Application No. 221894.

Office Action dated Jul. 13, 2015 in Chinese Application No. 2011800237331 with English comments from the foreign associate.

Australian Office Action in Australian Application No. 2011224246 dated Apr. 1, 2013.

European Office Action in European Application No. 11 754 117.7 dated Mar. 21, 2014.

Israeli Office Action in Israeli Application No. 221894 dated Jan. 20, 2015.

Israeli Office Action in Israeli Application No. 221894 dated Dec. 10, 2012.

Office Action dated Dec. 17, 2015 in U.S. Appl. No. 14/593,785.

International Search Report and Written Opinion dated Mar. 27, 2015 in International Application No. PCT/US15/11063.

Australian Office Action dated Feb. 6, 2017 in Australian Application No. 2014203466, in 6 pages.

(56) References Cited

OTHER PUBLICATIONS

International Search Report and Written Opinion dated Jan. 25, 2017 in International Application No. PCT/US16/61203, 15 pages

* cited by examiner

FLUID FILTRATION AND PARTICLE CONCENTRATION DEVICE AND METHODS

REFERENCE TO RELATED APPLICATIONS

The present application is a continuation of U.S. Non-Provisional application Ser. No. 13/045,349, filed Mar. 10, 2011, which claims priority to U.S. Provisional Application No. 61/340,072, filed Mar. 12, 2010, which is incorporated by reference herein in its entirety.

FIELD OF THE INVENTION

The present application relates to the filtration of particles from fluid streams, and more specifically to filter systems and their use.

BACKGROUND OF THE INVENTION

Filter systems contain cleaning devices, such as cleaning brushes, suction scanning devices, and back flush mechanisms. These devices are driven by various means including by hand, motor, turbine or vortex. However, existing fluid filtration devices have difficulty handling large concentrations of solids in the fluid stream. Generally cleaning mechanisms which can operate continuously while the system is filtering out-perform those which require the filtration system to be stopped for cleaning. And still, existing continuous cleaning mechanisms often suffer from premature fouling when the particle accumulation rate exceeds their limited cleaning rates.

SUMMARY OF THE INVENTION

In accordance with one aspect of the present invention, fluid filtration devices are provided. In some embodiments a fluid filtration device comprises a hollow housing comprising an inlet and filtered outlet, a hollow filter assembly located inside the housing and a rotating cleaning assembly located inside the filter. The hollow housing and/or the filter assembly may be cylindrical. The filter assembly comprises a filter material with an interior surface and an exterior surface and expanding pores that are narrower at the interior surface than the exterior surface. The filtration device may comprise a motor that rotates the cleaning assembly.

The filter material may comprise a smooth interior surface and may be, for example, an electroformed nickel screen. The expanding pores may be slotted pores and in some embodiments the slotted pores are oriented substantially with the axis of rotation of the cleaning assembly. The pores may be, for example, from about 1 micron wide to about 500 microns wide at the narrowest point.

The cleaning assembly may comprise one or more wipers, such as brushes, squeegees or scrapers. In some embodiments the cleaning assembly comprises a wiper that is spiral shaped. The wiper may be preloaded against the interior surface of the filter material. However, in other embodiments the wiper does not touch the filter material.

In some embodiments, the cleaning assembly comprises a distributor having one or more openings. The distributor may comprise a hollow tube oriented parallel to and extending the length of the cylindrical filter. Further the distributor may comprise one or more openings along its length. The distributor also comprises an open end in fluid communication with the inlet in the housing.

A differential back pressure regulator may be located at the filtered outlet of the housing. In some embodiments the differential back pressure regulator is configured to maintain pressure across the filter material at less than 5 psi. In other embodiments a pressure regulator may be located at the inlet and a back pressure regulator located at the filtered outlet. In some such embodiments, the pressure regulator and back pressure regulator are configured to maintain pressure across the filter at less than 5 psi.

In other embodiments, a filtration device is provided comprising a housing and an annular filter within the housing. The filter may comprise pores that are narrower at an interior surface of the filter than at the exterior surface of the filter. In some embodiments the pores may be slotted pores. The housing comprises an inlet that communicates with the internal surface of the filter and an outlet that communicates with a space between the external surface of the filter and the housing. In addition, the filtration device comprises a differential back pressure regulator at the outlet that is configured to regulate pressure across the filter at less than about 5 psi. The filter may be, for example, an electroformed screen, such as an electroformed nickel screen.

In some embodiments a cleaning assembly is located within the filter. The cleaning assembly may comprise a wiper.

In another aspect, methods of filtering a fluid are provided. In some embodiments a filtration device is provided comprising a housing, an annular filter located within the housing and a cleaning assembly comprising one or more wipers located within the filter. The filter may comprise an internal surface, an external surface and pores that are wider at the external surface than the internal surface. In some embodiments the filter is an electroformed nickel screen.

Fluid is fed to the inside of the filter and passed through the filter from the inside to the outside. In some embodiments fluid is fed to the inside of the filter through a distributor located within the annular filter. The cleaning assembly is rotated inside the filter such that the one or more wipers wipe the internal surface of the filter. In some embodiments one or more wipers contact the internal surface of the filter. In other embodiments the wipers do not contact the surface of the filter.

At least one of the wipers may be, for example, a brush, squeegee or scraper. In some embodiments the wipers are spiral. The wiping may move filtered particles from the internal surface of the filter to a collection region at one end of the housing.

In other embodiments, methods of filtering a fluid comprise passing the fluid through an annular filter comprising expanding pores, wherein the annular filter has an internal surface and an external surface and the pores expand from the internal surface to the external surface. The fluid passes from the interior of the annular filter to the exterior of the filter. The pressure across the filter may be maintained at less than about 5 psi. In some embodiments the filter comprises an electroformed screen, such as an electroformed nickel screen.

In some embodiments, the filter may be located within a housing comprising an inlet in fluid communication with the interior of the filter and an outlet in fluid communication with the exterior of the filter. Pressure may be maintained across the filter using a differential back pressure regulator located at the outlet. In other embodiments, pressure across the filter is maintained using a differential pressure regulator at the inlet and a back pressure regulator at the outlet. In still other embodiments, pressure across the membrane is maintained using a pressure regulator at the inlet and a back pressure regulator at the outlet.

The internal surface of the filter may be wiped with one or more wipers. The wipers may be rotated inside the annular filter.

BRIEF DESCRIPTION OF THE DRAWINGS

In the attached figures various embodiments are illustrated by way of example. Like reference numerals refer to similar elements.

DETAILED DESCRIPTION

The methods, systems and components described herein relate to filter systems for separating solids from fluids. The fluids may comprise air or other gas; or water, oil, fuel or other liquid. In some applications the fluid is the end product. Such applications may include, but are not limited to, drinking water, wastewater, recycled water, irrigation, swimming pools, food and beverage processing, produced water from oil and gas production, cooling towers, power plants, and marine ballast or bilge water. By way of example, drinking water is often produced by a series of filters removing ever finer particles and contaminants. A first or second level of filtration may comprise an automatic strainer to remove particles down to 10 microns in diameter. The filtered water would then be conveyed to a finer filter like an ultrafilter, microfilter or reverse osmosis filter. Some embodiments of the filter systems described herein are well suited to this application.

In other applications, such as biofuel production and other biomass technologies, a particulate is separated from a fluid stream and the filtered solid is the desired product. By way of example, algae may be harvested from the water in which it's growing for the purposes of making biodiesel. The algae is first filtered from the water and concentrated to a slurry. The oil is extracted from the algae by solvent extraction or other means, and then converted into biodiesel through a chemical process called transesterification. Some embodiments of the filter systems described herein are well suited to remove algae from its liquid growth media for these purposes.

Housing and Lid Assembly

Figure 1:
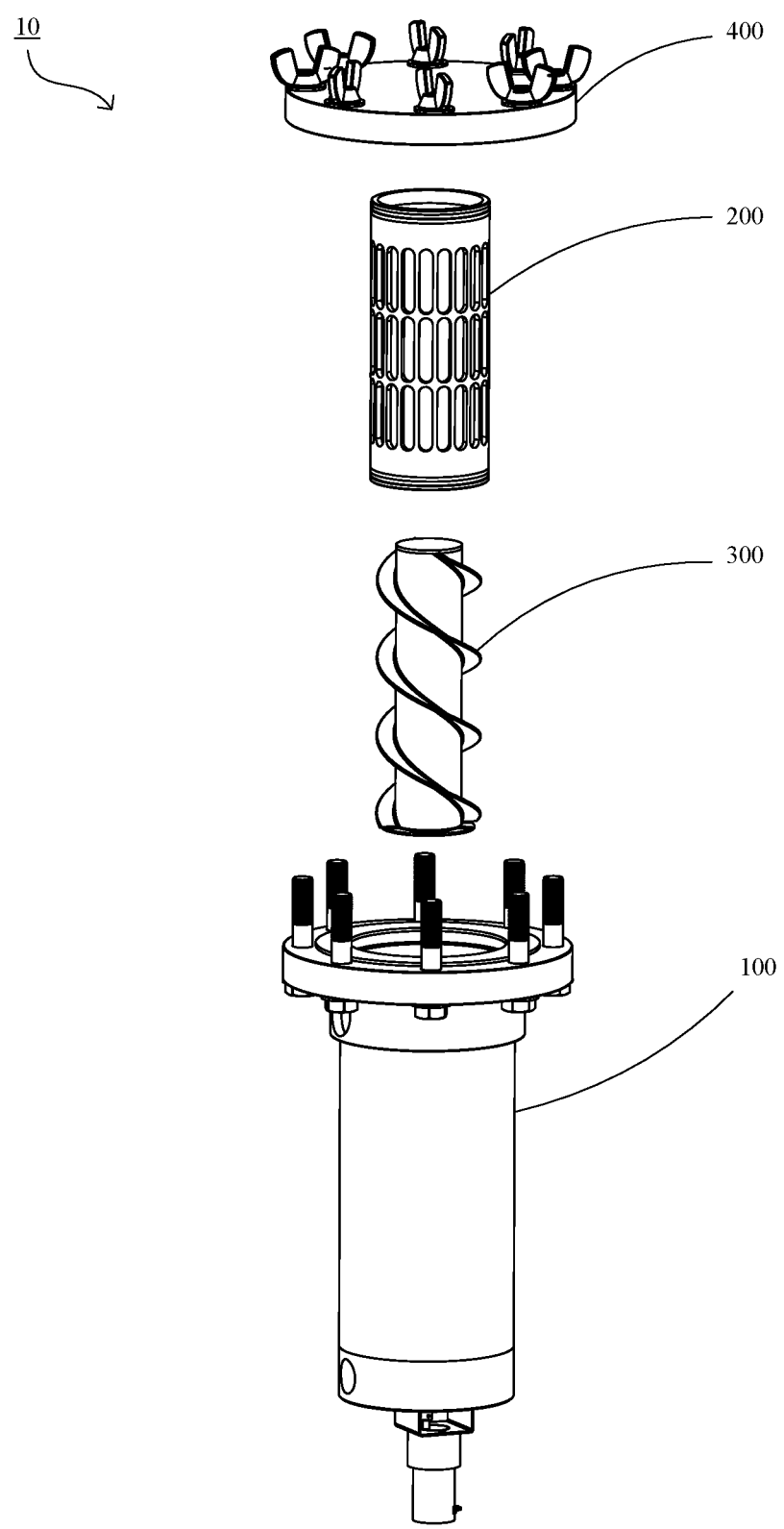
FIG. 1 is an exploded view illustrating each of the major components of one embodiment of a filter system.

In some embodiments, a filter system comprises a hollow housing, a hollow filter assembly, a cleaning assembly and a lid assembly. One embodiment of such a filter system is illustrated in FIG. 1. The filter system 10 as illustrated in FIG. 1 comprises a hollow housing 100, a hollow filter assembly 200, a cleaning assembly 300, and a lid assembly 400.

The hollow housing may take any of a variety of shapes. In the illustrated embodiment the hollow housing 100 is generally cylindrical in shape and comprises of one or more parts coupled together, such as by fasteners, a v-band clamp or other suitable connectors. Additionally the filter system 10 has a lid assembly 400 at one end of the housing 100 which is also coupled to the housing 100, for example by one or more fasteners, a v-band clamp, or other suitable connectors. The housing 100 and lid assembly 400 may be fabricated from one or more of a variety of materials, examples of which are plastic, fiber glass, stainless steel, and epoxy coated steel.

The filter assembly is typically annular in shape. As illustrated, the filter assembly 200 takes the shape of a hollow cylinder and is located inside and concentric with the housing 100. The filter assembly 200 comprises a filter material, such as a filter membrane, and in some embodiments may comprise a filter frame or other support structure. In some embodiments the filter assembly is generally open at both ends and contacts the housing, for example through a seal at one or both ends. Examples of seals are o-rings, x-rings, u-cups and gaskets. In the illustrated embodiment, the filter assembly 200 seals to the housing 100 at one end and the lid assembly 400 at the other end. The lid as well as the other end of the housing can be flat, semi-elliptical, hemispherical, or other suitable shape.

The housing and lid combination have one or more each of an inlet, a filtered outlet and a drain outlet. In some embodiments one or more inlets are generally located at one end of the filter system, while one or more filtered outlets and drain outlets are generally located at opposite ends of the filter system from the one or more inlets. In other embodiments, other arrangements may be used. The one or more inlets and outlets may be positioned on any combination of the side wall of the housing, the end of the housing, and the lid. Inlets provide a path for fluid to flow from a source to the interior of the filter assembly where it contacts the working surface of the filter material. The filtered outlet provides a path for fluid that has passed through the filter material to exit the housing. Drain outlets provide a path for fluid and/or solids that do not pass through the filter material to be removed from the housing.

Figure 2:
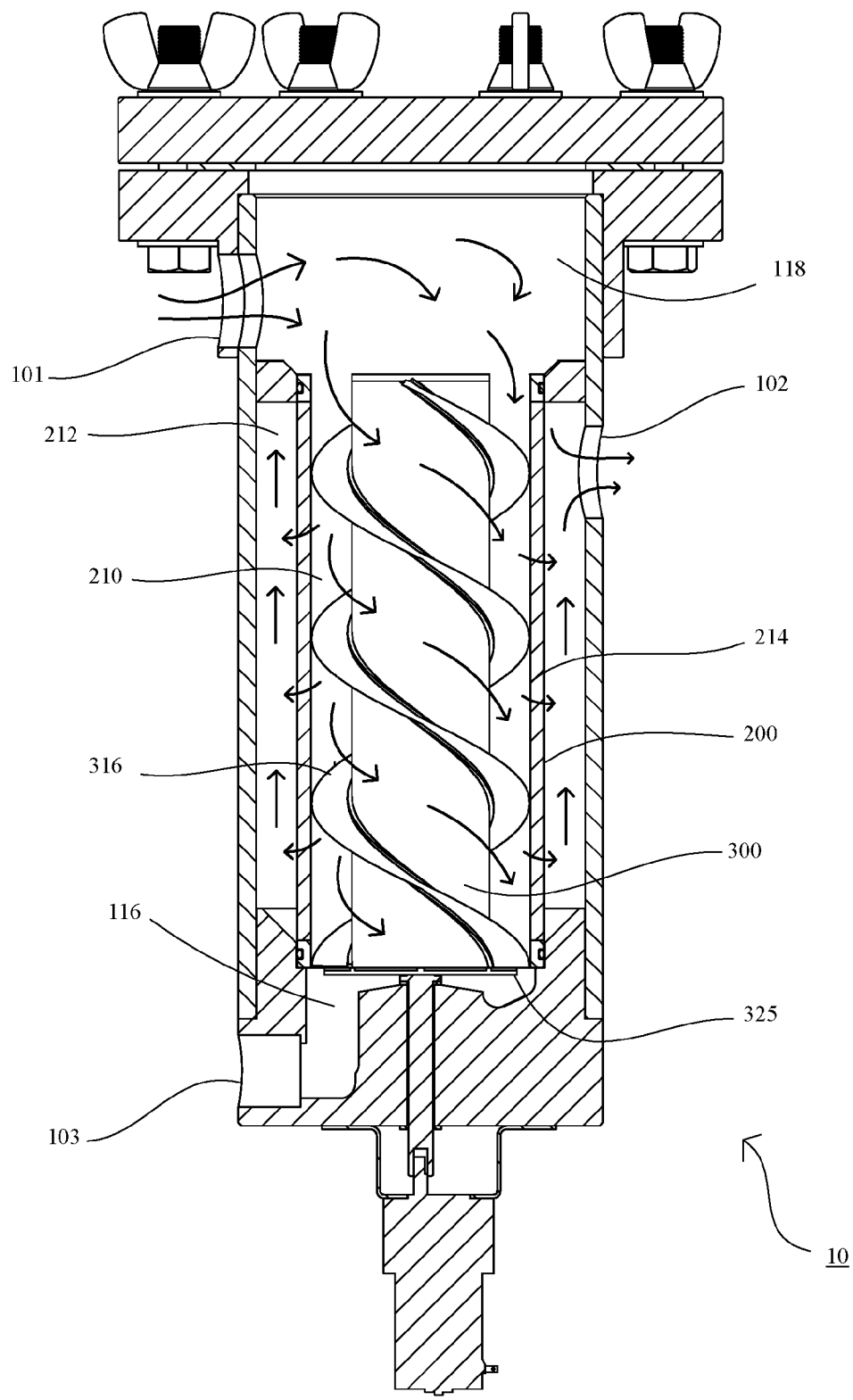
FIG. 2 is an illustration of one embodiment of the filter system where the filter is sealed to the housing at either end, and the cleaning assembly comprises wipers. The housing, filter and lid are shown in cutaway form while the cleaning assembly is not.
Figure 3:
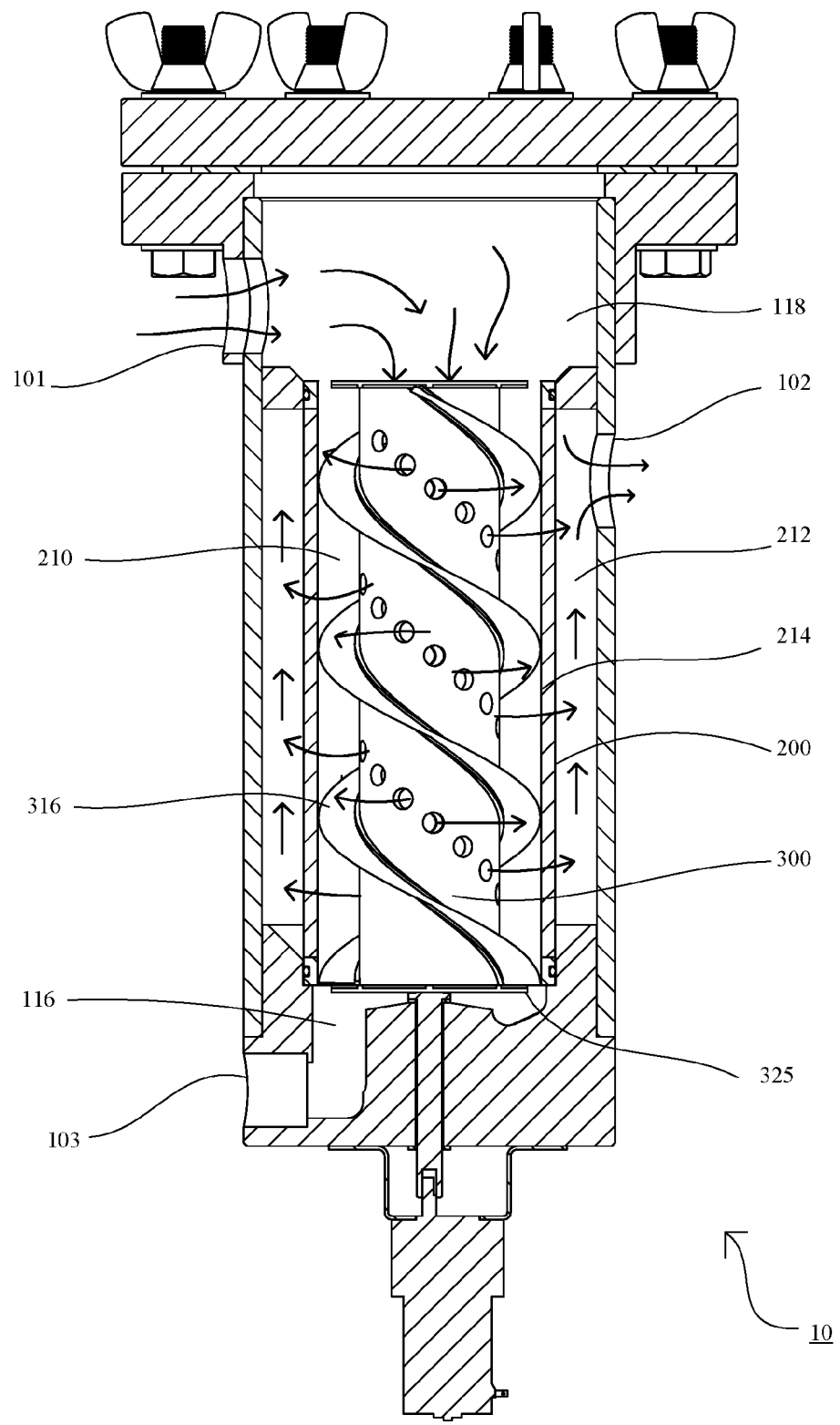
FIG. 3 is an illustration of another embodiment of the filter system where the filter assembly is sealed to the housing at either end, and the cleaning assembly comprises wipers and a distributor. The housing, filter and lid are shown in cutaway form while the cleaning assembly is not.
Figure 4:
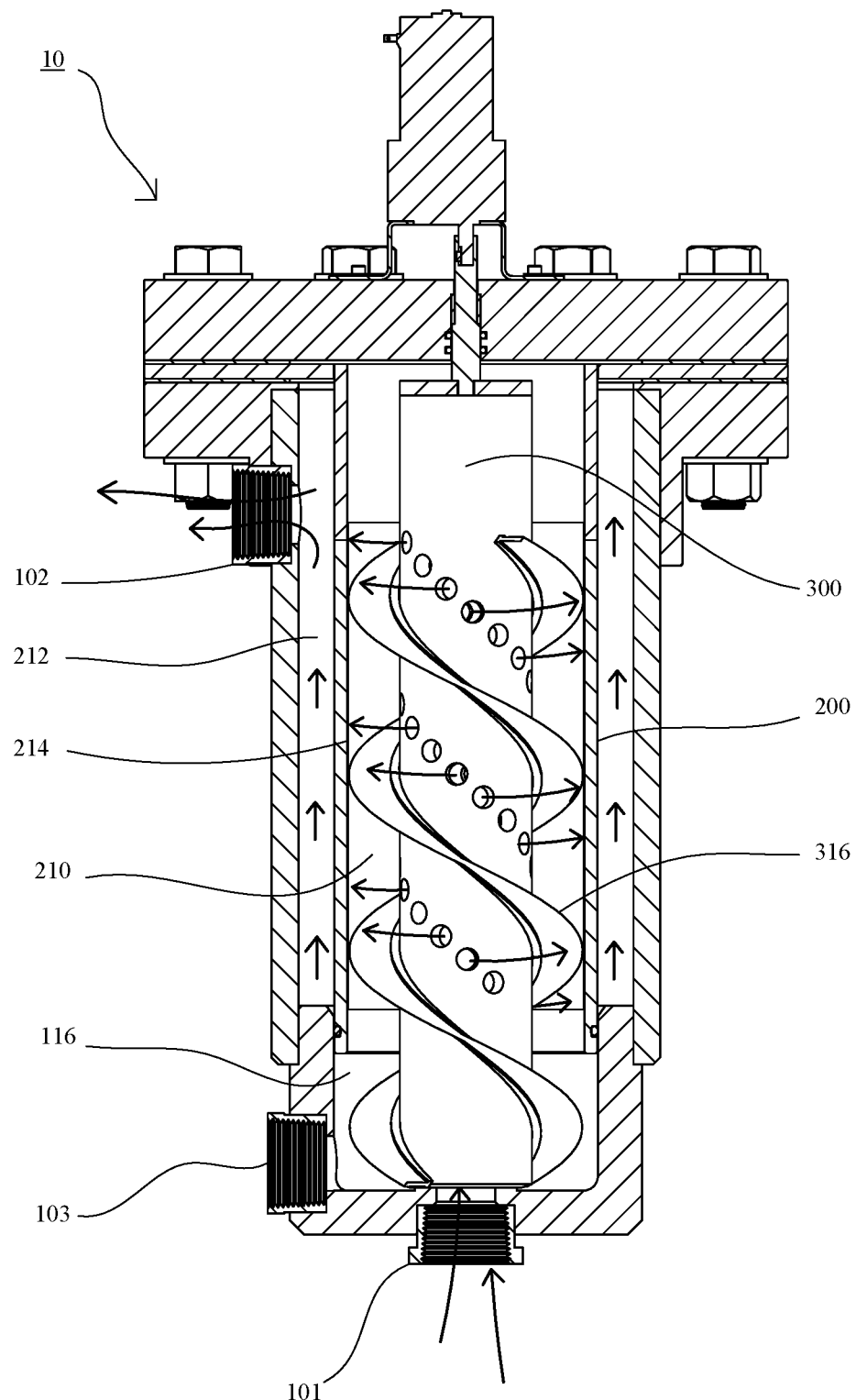
FIG. 4 is an illustration of an embodiment of the filter system where the filter assembly is sealed to the housing at one end and the lid at the other end, and the cleaning assembly comprises wipers and a distributor. The housing, filter and lid are shown in cutaway form while the cleaning assembly is not.

When the filter assembly is sealed to the housing, as illustrated in FIGS. 2 and 3, or the housing and lid as illustrated in FIG. 4, an unfiltered influent region 210 and a filtered effluent region 212 are created which communicate only through the filter material 214. The inlet 101, inlet region 118 and drain outlet 103 communicate with the influent region 210 at the inside of the filter 214, while the filtered outlet 102 communicates with the filtered effluent region 212 at the outside of the filter 214. The drain outlet 103 may be in communication with a collection region 116 where unfiltered fluid and filtered solids collect. Solids that collect on the working surface of the filter material 214 during operation of the filter system 10 may be moved by the action of wipers 316 to the collection region. A divider 325 may be located between the collection region 116 and the unfiltered region 210. In some embodiments, for example when the filtered fluid is a liquid, the filtered outlet 102 is located and the housing oriented to facilitate the expulsion of air from the system. This can be accomplished, for example, by positioning the filtered outlet 102 at or above the highest point of the filter material 214. In this way there is little to no need for an air purge valve. However, such an orientation of the filtered outlet 102 and housing are not required and in some embodiments the housing 100 comprises an air purge valve.

FIGS. 2 and 3 illustrate embodiments where the inlet 101 is located at the same end of the housing as the filtered outlet 102, albeit on opposite side walls. FIG. 4 illustrates another embodiment where the inlet 101 is located at the same end of the housing as the drain outlet 103.

Filter Assembly

Figure 5:
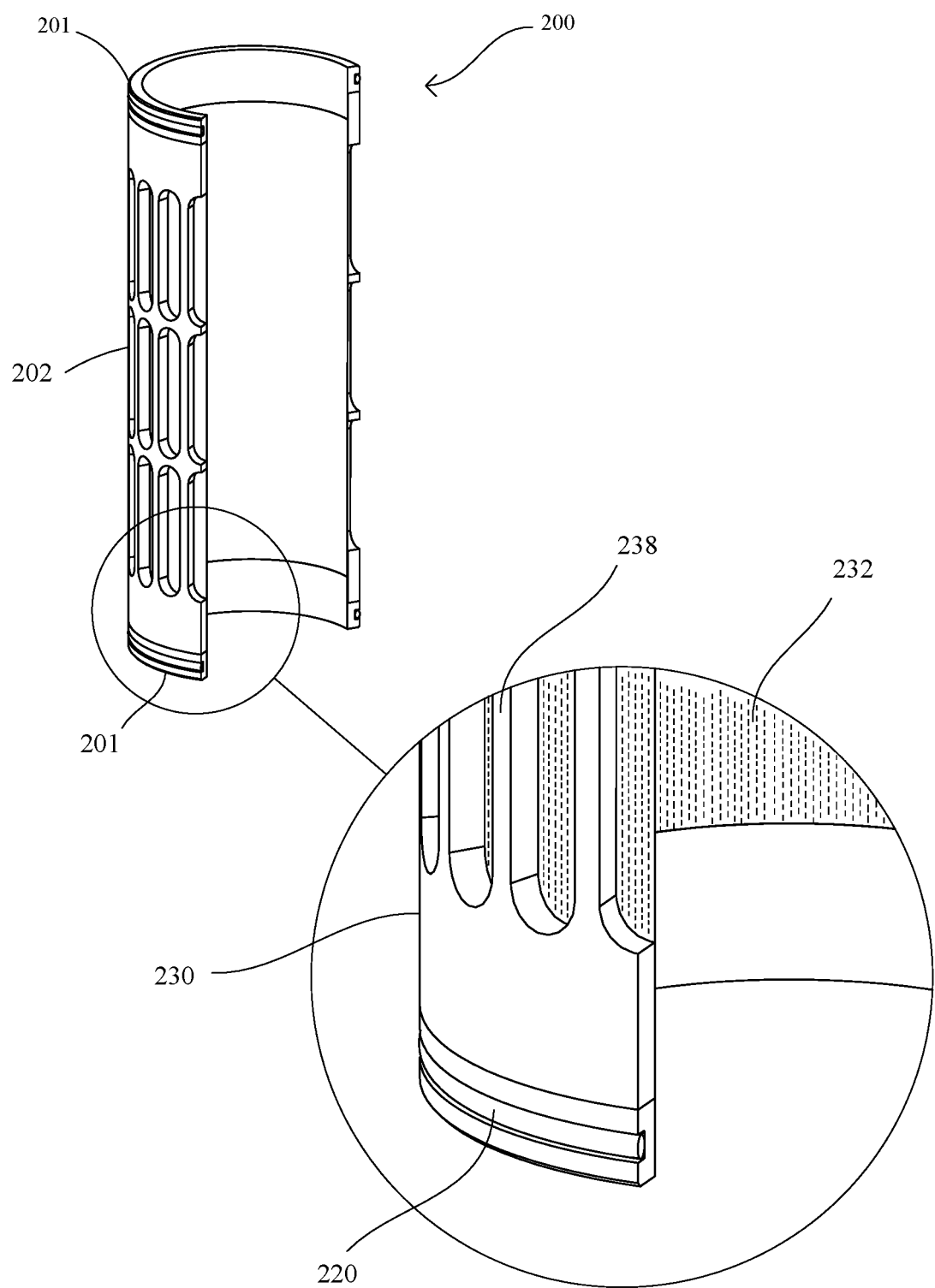
FIG. 5 illustrates an embodiment of the filter assembly comprising a filter support structure and a filter material.

In some embodiments a hollow cylindrical filter assembly 200 comprises a filter material 232 and a support structure 230, as illustrated in FIG. 5. In some embodiments, however, the filter material 232 will not require a support structure 230 and thus a support structure will not be used. In some embodiments the filter material is a surface filter. In the embodiments illustrated in FIGS. 2, 3 and 4, fluid passes from the influent region 210 at the inside of the filter to the effluent region 212 at the outside of the filter. In this way filtered particles collect on the inner, working surface of the filter 214. Suitable filter materials include but are not limited to electroformed screens, stacked disc filters, fabrics and membranes, woven metals, etched metal screens, and wedge wire filters. The filter material may be arranged to form an annular structure, as in the embodiment illustrated in FIG. 5.

In some embodiments a support structure is used. For example, with thin filter materials, such as screens, fabrics and other membranes, a support structure may be used to maintain the desired shape, typically an annular or cylindrical shape. The support structure may also contain seals at each end of the filter or make contact with seals at each end of the housing. In some embodiments a PVC plastic support structure is used to support a hollow cylindrical filter material. In other embodiments, a support structure comprises openings, where the openings are covered with the filter material.

A support structure may consist of one or more parts. As illustrated in FIG. 5, the support structure 230 may be assembled from three pieces which include two solid tubular end caps 201 and a supportive mid section 202 with a mesh of ribs 238. The end caps 201 may each comprise a seal. For example, each end cap 201 may have an o-ring groove to contain an o-ring seal 220. In embodiments where the support 230 is made of PVC, PVC solvent cement may be used to join the three structural pieces and simultaneously capture the open ends of the filter material cylinder. In other embodiments of the filter assembly the filter material is placed in an injection mold and the frame is molded directly onto the filter material in one or more stages. A plastic frame can be made from any number of suitable plastics including, for example, PVC, polypropylene and polycarbonate. In other embodiments of the invention the one or more support structure parts are made from stainless steel or other suitable materials and welded or bonded to the filter material. In further embodiments the supportive midsection is made from an overwrap of a screen material which can be, for example, plastic or metal and can be welded or bonded to the filter material. In other embodiments the filter material may be supported by a wedge wire wrapped in a spiral shape around the outside of the filter material.

The difference in pressure across the filter material, also referred to herein as transmembrane pressure (even though the filter material is not always a membrane), causes flow through the filter material. The transmembrane pressure is typically maintained at a constant value throughout the filtering process, but may be varied in certain circumstances, such as for cleaning. In some embodiments the transmembrane pressure may be about 10 psi or less, for example about 0.1 to 10 psi. In other embodiments the transmembrane pressure may be about 0.1 to 3 psi, 0.1 to 2 psi, or 0.1 to 1 psi. A sudden jump in the pressure can occur if the filter suddenly plugs. For this reason the filter is generally designed to sustain differential pressures in the range of at least 20 to 30 psi, but in some embodiments may sustain pressures as high as 150 psi or more.

As mentioned above, suitable filter materials include but are not limited to electroformed screens, stacked disc filters, fabrics and membranes, such as plastic fabrics and membranes, woven metals, etched metal screens, and wedge wire filters. In some embodiments, the filter material comprises pores with a maximum width of about 0.1 micron to about 1500 microns. In other embodiments, the pores may have a maximum width of about 1 to about 500 microns or about 1 to about 50 microns. The variation in pore width across a filter can be an important feature of the filter material. In some embodiments the absolute variation in pore width is minimized. It is also common to measure the variation as a percentage of pore width. In some embodiments the variation in pore width may range from about ±1% to about ±30%. In other embodiments such as with precision electroformed screens the precision may be measured in microns ranging from about ±0.1 micron to about ±5 microns. In some embodiments the filter material comprises expanding pores, which are narrower at the working surface than at the opposite surface. However, a variety of pore shapes may be used and a filter material having pores with an appropriate width, shape and other attributes can be selected by the skilled artisan for a particular application.

In some embodiments the filter material is a precision electroformed screen. The electroformed screen can be made from a number of materials for example nickel, gold, platinum and copper. A filter material of this type may comprise a substantially smooth working surface and regularly shaped expanding pores. That is, the pores are narrower at the working surface than at the opposite surface. In some embodiments the pores may be conical. Screens of this type may be used that have pores ranging in size from about 1500 microns down to about 0.1 micron at the narrowest point, but variations of the technology can utilize larger or smaller pores. In some embodiments a precision electroformed screen is used for filtration in the range of 5 to 50 microns and has pores with a corresponding width at the narrowest point.

In some embodiments a filter material is used that comprises a precision electroformed nickel screen. One such screen is called Veconic Plus Smooth, fabricated by and available from Stork Veco BV of The Netherlands. Veconic Plus Smooth is especially well suited to filtration in the range of about 5 to 50 microns.

Figure 6:
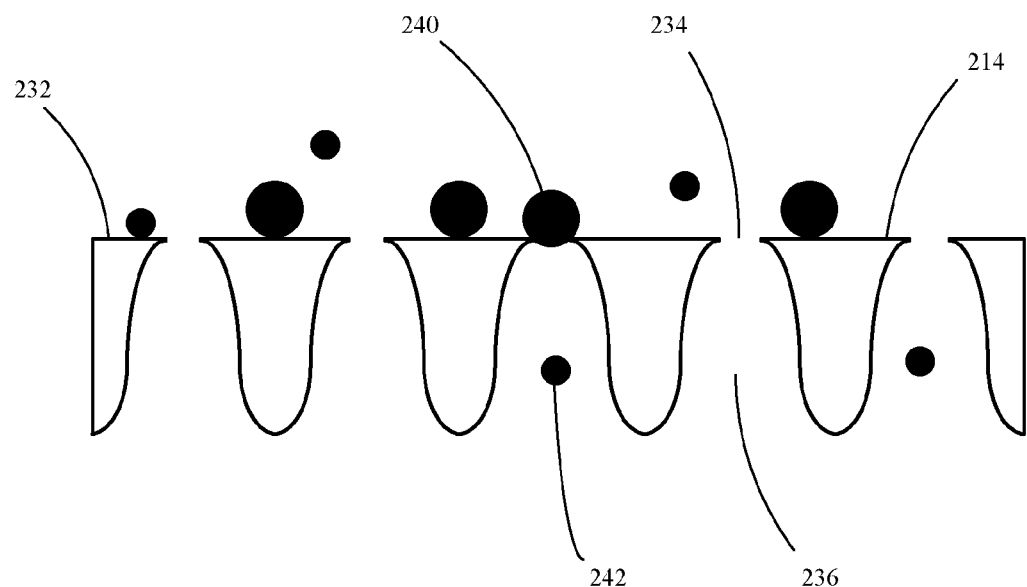
FIG. 6 is a schematic illustration of a cross-section of a filter material having a smooth working surface and expanding pores.

A filter material may comprise pores where the internal surfaces of a pore may be straight, concave or convex. In some embodiments, as illustrated in FIG. 6, the filter material 232 comprises pores where the profile of the pore is substantially narrowest at the working surface 214 of the filter. In some embodiments where the filter is a cylindrical or annular filter, the working surface may be the internal surface. The pore may remain the same width or become wider across the filter from the internal or interior working surface to the external or exterior surface. In some embodiments the pores comprise an expanding region 236 and open progressively wider from the working surface towards the opposite surface. In this way, particles 242 small enough to enter a pore opening 234 have little or no chance of getting stuck inside a pore 236. Surface filters of this type trap particles 240 that are too large to pass through the filter material on their working surface 214, often at the mouth of a pore 234, where they can be acted upon by a cleaning mechanism.

Figure 7:
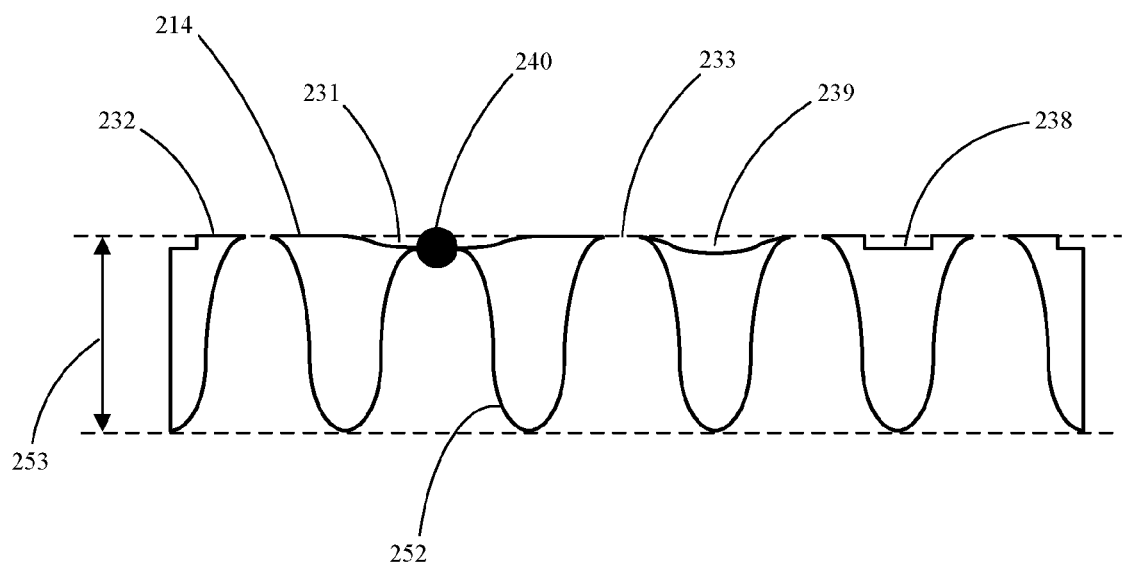
FIG. 7 is a schematic illustration of a cross-section of a filter material having expanding pores and a smooth working surface wherein the boundary of the pore opening at the minimum width of the pore opening (the narrowest part of the pore) substantially defines the highest local point on the working surface.

In some embodiments the working surface of the filter is smooth. Though the smooth working surface of the filter may be substantially flat, it may also have small, uneven features, for example as illustrated in FIG. 7. These uneven features may be sudden steps 238 or gradual valleys 239. However, the filter is preferably structured such that during filtration particles that are not able to pass through the pores are retained at the highest local point on the working surface.

In some embodiments the narrowest part of the pore opening 233 substantially defines the highest point on the working surface 214 in the vicinity of the pore. In other embodiments, the narrowest part of the pore opening 231 may be slightly below the highest local point on the smooth working surface 214, for example the narrowest part of the pore opening may be at a depth less than half the width of the pore opening. Thus, for a pore with a narrowest opening of 20 microns, the 20 micron opening would be less than 10 microns below the highest point on the smooth working surface in the vicinity of the pore. This makes it possible for a cleaning mechanism to make substantial contact with pore blocking particles 240 and wipe them away from the pore openings. The area of filter material between the pores is referred to as the bars 252.

Figure 8:
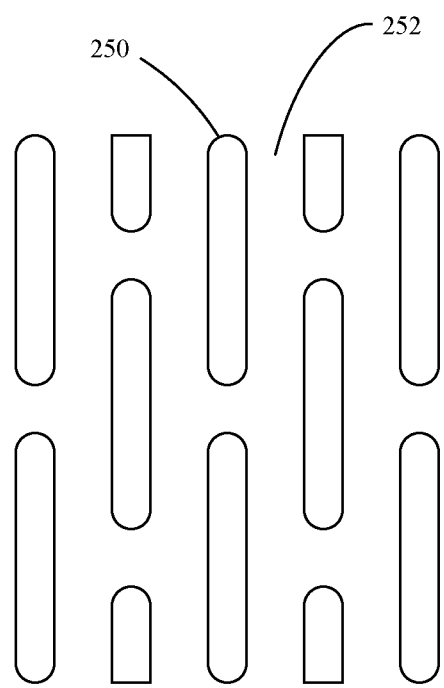
FIG. 8 illustrates a portion of the surface of a filter material comprising an alternating pattern of slotted pores.
Figure 9:
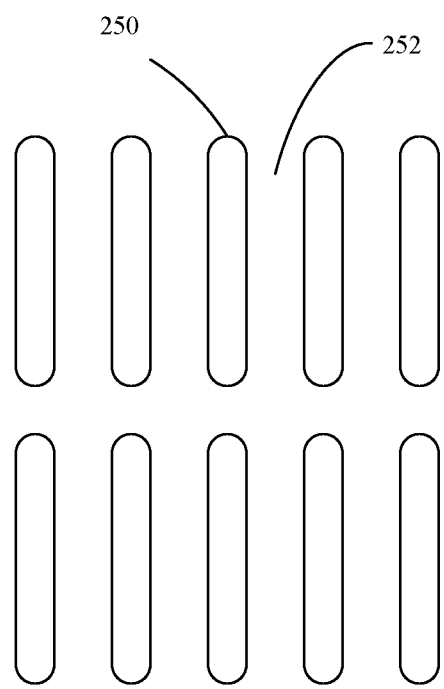
FIG. 9 illustrates a portion of the surface of a filter material comprising a non-alternating pattern of slotted pores.

The pores can have many planform shapes, examples of which are circular, square or slotted. Slotted pores 250 which are longer than they are wide, as illustrated in FIGS. 8 and 9, are used in some embodiments and tend to offer less fluid resistance than a number of smaller circular or square pores having the same combined open area. The drawback of slotted pores 250 is that they can pass long skinny particles that are essentially larger than the slot width, but these particles are much less common. Nevertheless, in some embodiments circular, square or irregularly shaped pores are used.

In some embodiments, filters may have a thickness of about 10 to 10,000 microns. This is illustrated as the bar thickness 253 in an exemplary embodiment in FIG. 7. Electroformed nickel screens, as used in some embodiments, generally have a thickness of 150 to 300 microns, though they may be thicker or thinner. A sheet of filter material has many pores, and in some embodiments substantially all of the pores have approximately the same length and width. The pores may be any shape. In some embodiments they are circular. In other embodiments the pores are longer than they are wide. In some embodiments the length of each pore is generally about 400 to 500 microns, for example about 430 microns, but may be larger or smaller. The width of the pores may be selected for the particular filtration application. In some embodiments, widths in the range of about 0.1 to about 1500, 1 to 500 or 1 to 50 microns are used. In some applications, like the harvesting of microalgae or yeast cells without flocculation, widths from about 0.1 to about 1 micron may be used.

In some embodiments the pores may be generally arranged in an alternating checkerboard pattern as with the pores 252 in FIG. 8, but may also be arranged in a non-alternating pattern, as in FIG. 9. The bars 253 are also shown in FIGS. 8 and 9. Screens with non-alternating patterns are generally more brittle than those with alternating patterns, which tend to be more flexible.

In some embodiments the cumulative open area of all the pores for a filter material is maximized in order to maximize the filtrate rate. For smaller pores the number of pores per unit length can be maximized in any given direction. With many screens, such as electroformed nickel screens that have expanding pores, the maximum open area of pores tends to be inversely proportional to the sheet thickness, i.e. thicker sheets have fewer pores. The number of pores per unit length in a given direction is influenced by many variables, one of which is the lithographic process by which the screens are made.

In some embodiments a screen may have a thickness of about 200 microns with pores which are about 20 microns wide by about 430 microns long and arranged in a mesh of about 160 pores per inch (6299 $m^{-1}$) in the direction perpendicular to the slots and about 40 pores per inch (1575 $m^{-1}$) parallel to the slots. This equates to an open area of about 9%.

In some embodiments the filter material takes the form of a hollow structure such as a hollow cylindrical or annular structure. Seamless hollow cylinders can be used and can be fabricated, for example, in an electroforming process. In other embodiments, cylinders can be made from sheets of filter material which are then seam welded into a cylinder. Methods of joining seam edges are known in the art and may include, for example, resistance welding or soldering. In this way cylinders of filter material of any size and length can be made.

In some embodiments a filter material, such as an electroformed nickel screen or other type of electroformed metal screen, is initially made in a square sheet, such as a sheet one meter on each side, and then trimmed to the proper size for the filter. Filter material may be made in larger or smaller sheets depending on the way they are manufactured, for example depending on the available electroforming equipment. The trimmed sheet is flexible and is held in the shape of a cylinder while the seam edges are resistance welded, silver solder or joined by another process known to someone skilled in the art.

In some embodiments, the filter material is coated with one or more materials to provide or improve a desired property. For example, coatings of nickel-phosphorus alloy, chrome alloy or other suitable metal alloys may be used to impart attributes such as hardness and corrosion resistance. In other examples, a filter material may be coated with silver for its antimicrobial properties or a composite containing PTFE for its low friction. In some embodiments, an electroformed nickel screen generally comprises a nickel base and may include one or more additional coatings, such as those described above.

Filter fouling generally occurs in two stages. Initially particles block the pores of the filter material reducing the effective open area. This is simply called "pore blocking." Secondly a layer of particles collects at the filter material surface creating what is called a "cake" layer and this causes an ever decreasing filtrate rate. Crossflow filtration has been shown to be effective in delaying fouling, for example in conjunction with electroformed nickel screens. This mode of operation is generally considered the elegant solution to filter fouling, but the crossflow stream limits the ultimate recovery rate of influent where filtrate is the desired product; and consequently limits the maximum solids concentration in applications, such as algae and yeast harvesting, where rejectate is the product.

Surface filters are well suited to be cleaned in place through mechanical means. A number of automated mechanical cleaning technologies may be used, alone or in combination, in various embodiments of the disclosed filter systems and methods. In some embodiments backflushing may be used. In backflushing the forward flow through the filter is entirely stopped and temporarily reversed to dislodge the pore blocking particles as well as the entire cake layer. This backflush liquid containing solids is discarded through an exhaust valve, such as a drain outlet. It is sometimes combined with the operation of a cleaning brush or wiper to aid the cleaning of the filter screen. In other embodiments suction scanning may be used. Here one or more nozzles scan the filter surface. These nozzles have a large suction force causing liquid to flow backward locally through the filter screen in the vicinity of the nozzle. This pulls the filter cake off the screen and sends it to an exhaust valve where it is discarded. In this way a small portion of the filter screen is being cleaned while the rest of the screen continues to operate normally. While general backflush filters have downtime during their cleaning cycle, suction scanning filters continue to operate albeit at a lower net flux rate. As with crossflow filtration, the backflush stream in both systems limits the ultimate recovery rate of influent where filtrate is the desired product; and limits the maximum solids concentration where rejectate is the product.

In some embodiments of the invention described herein, the filter material is cleaned exclusively by use of a wiper. Thus, backflush and/or crossflow are not employed. In other embodiments, the filter material is cleaned by backflush or crossflow. In some embodiments the filter material is cleaned by a wiper in conjunction with a backflush, crossflow or both. Electroformed nickel screens which have expanding pores and a smooth working surface are well suited to be cleaned by a wiper.

During cleaning the rejected particles move across the surface of the filter material, for example by means of a wiper and/or a crossflow velocity. It is generally advantageous to orient the slotted pores of the filter material with their long dimension substantially perpendicular to the likely path of a rejected particle. Thus in some embodiments the filter material comprises slotted pores that are oriented such that the long aspect of the pores is perpendicular to the direction of movement of a wiper.

When a wiper is substantially straight and rotates inside a cylindrical filter, particles move more circularly around the filter than axially down the filter. In this case the slots may be oriented with the axis of filter.

A wiper may also take the form of a spiral in which case the particles may be pushed along a spiral path on the surface of a cylindrical filter. Depending on the pitch of the spiral, the path may be more along the axis of the filter or more along the circumference of the filter. If the filter material comprises slotted pores, the slots can be oriented perpendicular to that path, though a pure axial or circumferential orientation is used in some embodiments, for example due to manufacturing limitations.

Cleaning Assembly—Wipers

A cleaning assembly is typically positioned inside the filter assembly and in some embodiments comprises one or more wipers, for example as illustrated in FIG. 2. Fluid may move from the inlet of the housing to contact the inside wall of the filter material by passing around the cleaning assembly, for example as illustrated in FIG. 2, or through the cleaning assembly, for example as illustrated in FIGS. 3 and 4. Filtered particles collect on the inner working surface of the filter and when the cleaning assembly is rotated the wipers clean the working surface of the filter generally by moving filtered particles along the surface and collecting them ahead of the wiper. The wipers may also lift particles off the surface back into the fluid or on to the wipers themselves.

The one or more wipers may be straight or take other useful shapes. In some embodiments the wipers take a substantially spiral shape along the length of the cleaning assembly. See, for example, wipers 316 in FIGS. 3 and 4. In some embodiments the cleaning assembly comprises a single spiral-shaped wiper. In other embodiments, the cleaning assembly comprises two or more spiral shaped wipers. Spiral shaped wipers push particles along the filter surface towards one end of the housing, where they can be collected in a collection region. The concentration of particles on the wiper will typically increase in the direction of the collection region of the housing.

In some embodiments one or more spiral shaped wipers have a fixed pitch and in other embodiments they have a variable pitch. A typical pitch of the spiral wiper, for example for a cylindrical filter that is 4 inches in diameter, would be one complete turn for every 6 inches of cleaning assembly or, in other words, 60 degrees per inch, but could be less or more. In some embodiments the spiral wiper or wipers have a pitch of about 10 to about 360 degrees per inch. Variable pitched wipers have a pitch that changes along the length of the cleaning assembly to accommodate the buildup of particles on the wiper. By way of example, the pitch may change from 10 degrees per inch at the far end of the cleaning assembly to 360 degrees per inch at the end closest to the collection region.

It is generally advantageous to limit the speed of the wipers along the surface of the filter to less than 100 inches per second but this value may be higher or lower depending on the filter and wiper design. In embodiments in which the wiper touches the filter material, friction between the wipers and the filter material causes wear of the wipers, filter material or both. Faster wipers tend to create more turbulence in the unfiltered region of the housing which may interfere with the movement of particles towards the collection region. The wipers may also break particles apart into smaller particles which then pass through the filter material. When the wiper speed is limited, the cleaning frequency on the material can be increased by adding more wipers. A cleaning assembly will typically have from about 1 to about 10 wipers, for example 2, 4, or 8 wipers, but may have more or less.

Wipers may take many forms examples of which are brushes, squeegees and scrapers and may be rigid or flexible. In one embodiment multiple wipers all take the same form and in other embodiments multiple wipers take a combination of forms. Brushes are generally made from non-abrasive plastic fibers like nylon, polypropylene, or polyester, though they may be made from other suitable materials. As particles decrease in size, brushes tend to be less effective and squeegees become more effective. Squeegees may be made from any number of common natural or synthetic rubbers, an example of which is polyurethane. In other embodiments one or more wipers may comprise a scraper. The scraper may be made from any number of suitable plastics such as polycarbonate and PTFE, or other suitable materials.

In some embodiments one or more of the wipers are preloaded against the surface of the filter by deflecting the wiper, such as a brush or squeegee. In other embodiments at least one of the wipers 316 does not touch the surface 214 of the filter but extends to a height slightly above the surface. In some embodiments the wipers may extend to between about 0.001 to 0.1 inches from the surface of the filter, 0.01 inches for example. In this way, circulation of the wipers may create a local crossflow of fluid which tends to push particles along the surface, while the wipers do not actually touch the surface of the filter material.

Figure 10:
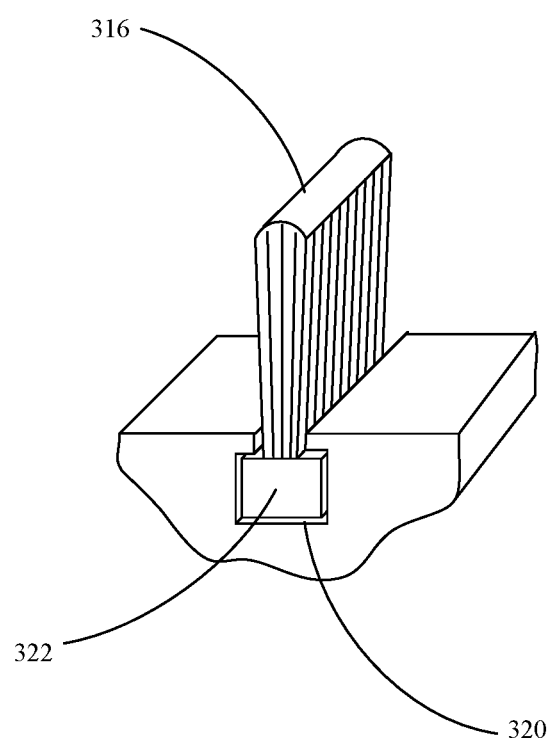
FIG. 10 illustrates a groove on a cleaning assembly which captures the flexible backing of a wiper.

The wipers may be supported by a structure at one or both ends and/or by a center structure as in FIGS. 2, 3 and 4. The center structure may be solid or hollow and take any number of suitable cross sectional shapes, examples of which are round and polygonal. In one embodiment of the invention the center structure is substantially round and has one or more grooves on its exterior surface. As illustrated in FIG. 10, a wiper 316 may have a flexible backing 322 which is inserted into the groove 320 on the center structure. In some embodiments a wiper is glued into a groove 320. In other embodiment the groove 320, as in FIG. 10, has a dovetail or other suitable shape to retain a wiper 316. In one embodiment a wiper is held in place by friction along the length of the groove. In other embodiments a wiper is retained at each end by a plug, end cap, or other suitable means. In other embodiments one or more wipers are glued to a smooth support structure. As mentioned above, in other embodiments the wipers are self-supporting and are not attached to a support structure that runs the length of the wipers. However, they may be supported at one or both ends.

Cleaning Assembly—Distributor

In some embodiments the center structure of the cleaning assembly comprises a hollow tube which can act as a distributor for the filter assembly. The hollow tube is oriented parallel to the length of the filter. The distributor comprises at least one open end which is in fluid communication with an inlet in the housing. For example the distributor may communicate directly with an inlet 101 as in FIG. 4, or may communicate with an inlet region 118 which in turn is in communication with one or more inlets 101 as in FIG. 3.

Figure 11:
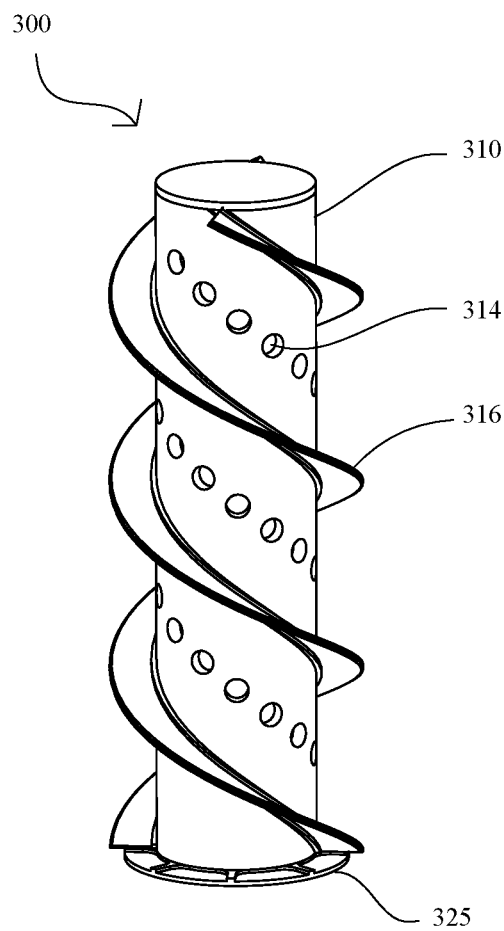
FIG. 11 illustrates an embodiment of the cleaning assembly comprising a distributor with evenly spaced holes arranged in a spiral pattern.

The distributor may extend the entire length of the filter and has one or more openings along its length which distribute the fluid to selected portions of the filter surface. The one or more openings in the distributor may be substantially perpendicular to the length of the distributor. The openings may, for example, be circular holes, for example for ease of manufacturing, but they may also be polygons, slots or any number of suitable shapes. The openings may include tubes or other features which extend outward from the distributor towards the filter surface and direct fluid to the filter surface. A distributor 310 with openings 314 is illustrated in FIG. 11.

In some embodiments, through a rotation of 360 degrees, the distributor can sequentially direct fluid to the entire working surface of the filter. In the embodiment shown in FIG. 11 there are multiple openings 314 which all have the same size. By way of example the openings may be circular holes with a diameter of about 0.25 inches and a center to center spacing of about 0.50 inches along the length of the distributor. In other embodiments multiple openings in the same distributor have different sizes. It is generally advantageous to size the openings in order to balance the amount of flow and pressure being distributed to each selected portion of the filter. Thus the openings may get progressively larger as they get farther away from the inlet and/or the opening in the distributor that is in communication with the inlet. This may take the form of circular holes which get progressively larger in diameter as they get farther away from the inlet in the housing.

In some embodiments the openings point radially outward from the axis of the distributor. In other embodiments the openings are offset from the axis of the distributor and point substantially along a line tangent to the axis of the distributor. Openings which are offset from the axis of the distributor produce flow with a velocity component that is tangential to the filter's surface. In some embodiments of the invention the tangential velocity helps to rotate the cleaning assembly. Additionally, this crossflow may delay fouling and increase performance.

Figure 12:
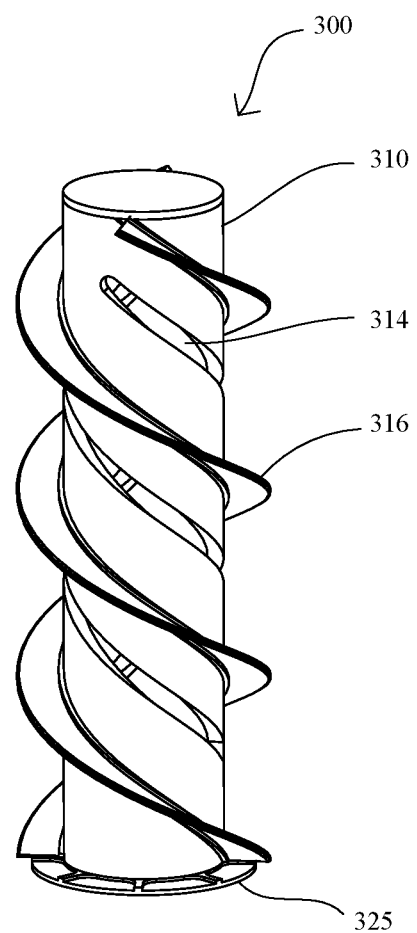
FIG. 12 illustrates an embodiment of the cleaning assembly comprising a distributor with slots arranged in a spiral pattern.

When the cleaning assembly comprises both a distributor and one or more wipers the pattern of openings may match the shape of the wipers. This is illustrated, for example, in FIGS. 11 and 12, where the pattern of openings 314 generally matches the shape of the one or more wipers 316. Thus a spiral shaped wiper 316 will have a spiral pattern of openings 314. In one embodiment the openings 314 are a spiral pattern of holes as shown in FIG. 11, and in another embodiment they are one or more spiral shaped slots as shown in FIG. 12. The size of the openings may vary along the length of the distributor. For example, the slot width may vary along the length of the distributor 310. The slot width may increase with distance from the inlet into the distributor.

When there is more than one wiper, there will generally be a pattern of openings associated with each wiper. The pattern of openings may alternate with the wipers such that each two wipers have a pattern of openings between them.

Cleaning Assembly—Support and Drive

Figure 13:
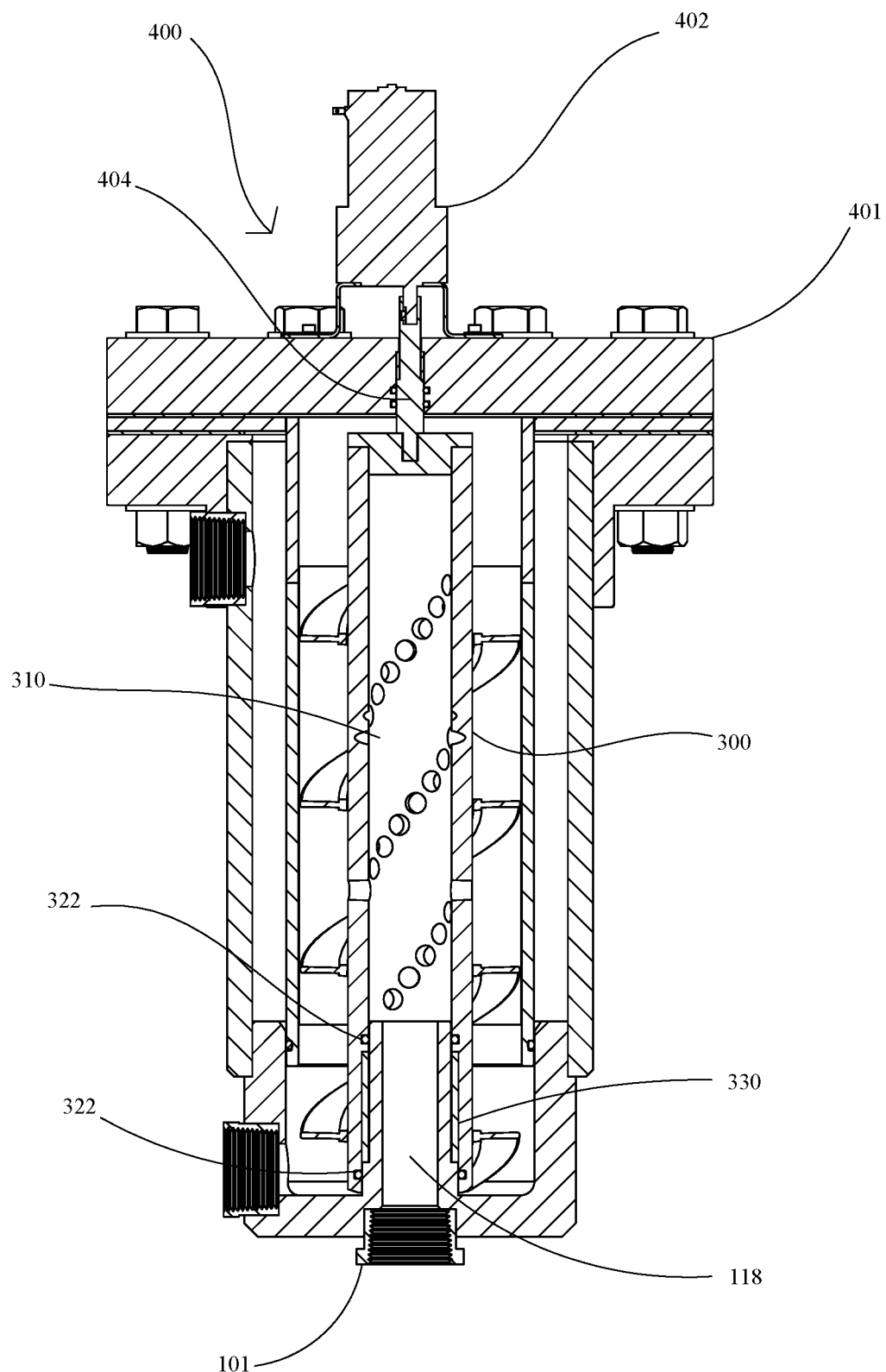
FIG. 13 illustrates an embodiment of the filter system in cutaway showing the cleaning assembly supported by the inlet tube.
Figure 14:
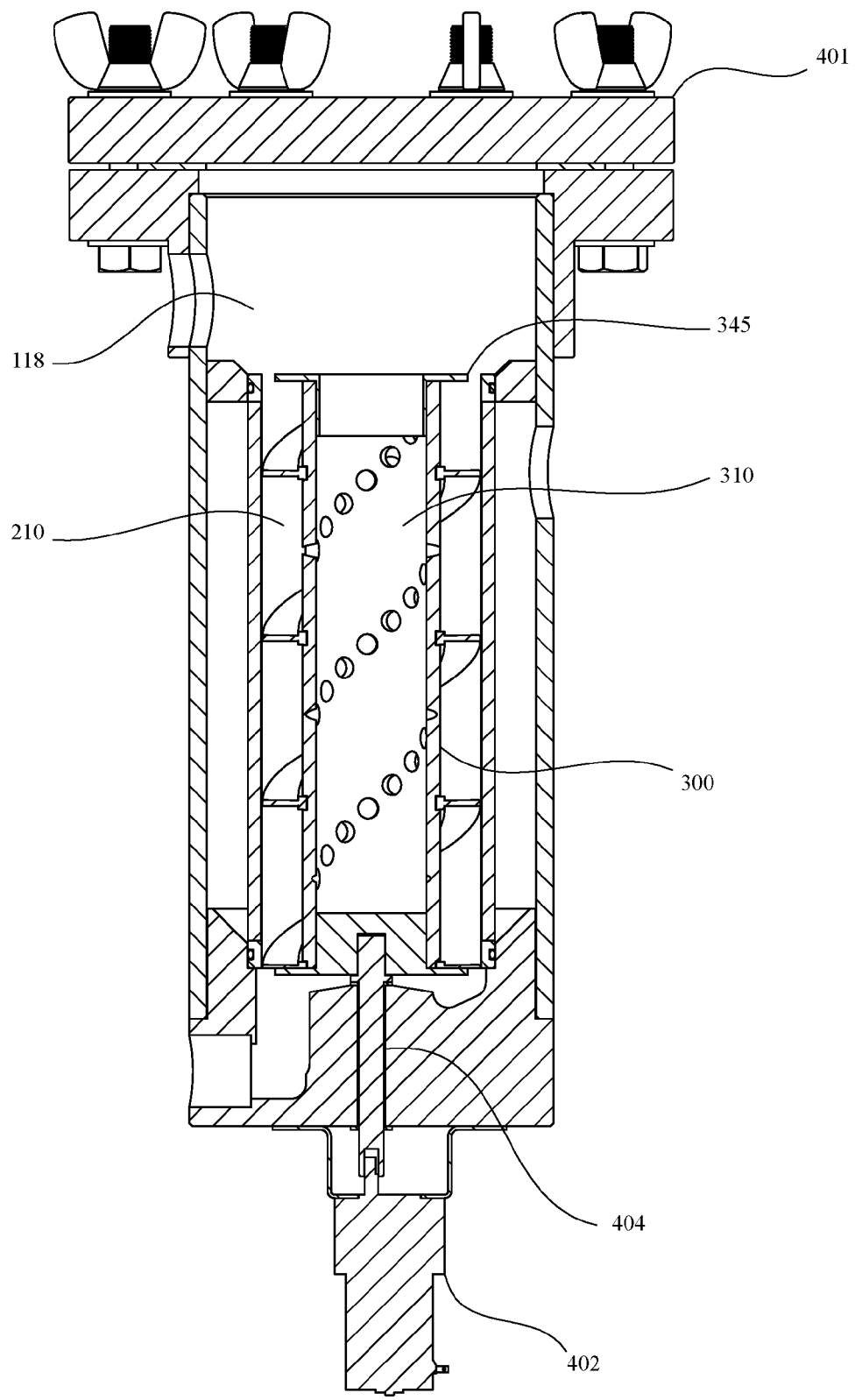
FIG. 14 illustrates an embodiment of the filter system in cutaway showing the cleaning assembly supported by a drive shaft at one end of the housing.

The cleaning assembly may be supported at one or both ends by one or more bearings, examples of which are ball bearings and journal bearings. In the embodiments illustrated in FIG. 4 and FIG. 13, the cleaning assembly 300 is supported by a sleeve bearing 330 on the inlet tube 118 which extends into the housing. One or more seals, such as o-ring seals 322 may also be included to restrict fluid travel around the bearings. A drive shaft 404, which penetrates the lid 401, may also be supported by one or more bearings and sealed by one or more seals. The drive shaft may be coupled to the cleaning assembly 300 using, for example, a spline drive, square drive or interlocking face gears. The lid assembly 400 comprises a motor 402 which couples to the drive shaft 404 and drives the rotation of the cleaning assembly 300. The lid assembly with motor 402 and shaft 404 can be removed from the housing, thus decoupling the shaft 404 from the cleaning assembly 300. In another embodiment the distributor does not get decoupled from the lid assembly but instead gets removed together with the lid assembly. In further embodiments, as illustrated in FIGS. 2 and 3 and further illustrated in FIG. 14, the cleaning assembly is entirely supported by a drive shaft which is supported by bearings and seals at one end of the housing. A motor 402, outside of the housing, couples to the drive shaft 404 and drives the rotation of the cleaning assembly 400.

In even further embodiments the cleaning assembly is driven by other mechanisms, such as by hand or by turbine. A turbine may be located such that fluid flowing into the housing passes through the turbine and turns the cleaning assembly. For example, in the embodiments illustrated in FIGS. 2 and 3 the cleaning assembly may comprise a turbine (not shown) located in the inlet region 118 of the housing. Fluid passing from the inlet region 118 to the distribution region 210 would pass through the turbine driving rotation of the cleaning assembly. In the embodiment illustrated in FIG. 13 a turbine (not shown) may be located inside the distributor 310 such that fluid passing from the inlet tube 118 to the distributor 310 causes rotation of the cleaning assembly 300. In this way no external power source is required to drive the cleaning assembly 300. The power of the flowing fluid may alone provide the drive mechanism.

Cleaning Assembly—Inlet Region Divider

In some embodiments, one or more dividers are used to direct fluid in the housing, such as to direct fluid from the inlet to the distributor. For example, when the cleaning assembly, as in FIG. 14, comprises a distributor 310 which is open at one end to an inlet region 118, it can be advantageous to divide the inlet region 118 from the distribution region 210. In this embodiment a divider 345 protrudes radially outward from the distributor 310 forcing fluid to flow through the distributor to reach the filter. In one embodiment the structure engages the inside wall of the filter assembly or housing through a bearing, seal or both. In another embodiment the divider does not engage the filter assembly or housing and instead allows a small amount of fluid to leak around the divider. In other embodiments the divider is attached to the filter or housing and protrudes inward towards the distributor.

Cleaning Assembly—Collection Region Divider

The rotation of the cleaning assembly drives particles towards one end of the housing where the particles collect in a collection region. The collection region and the cleaning assembly are generally configured to push particles towards the drain outlet. In some embodiments, a divider may separate the inlet region or unfiltered region from the collection region.

When the cleaning assembly comprises a distributor 310, the distributor may not have openings 314 in this region, as in FIG. 3, to avoid turbulence, but may or may not have wipers 316. Wipers 316 in the collection region 116 may be straight, spiral or take other useful shapes and may or may not engage the housing wall. In the embodiment illustrated in FIG. 4 the same wipers which engage the filter continue through the collection region 116 to the end of the housing. In other embodiments additional wipers are arranged on the cleaning assembly to engage the end of the housing.

It can be advantageous to physically divide the collection region from the distribution region to avoid particles returning to the filter surface. In the embodiments illustrated in FIGS. 2 and 3 and those illustrated in FIGS. 11 and 12 this is accomplished by a divider 325 which rotates with the distributor. In other embodiments the divider is non-rotating and instead affixed to the filter wall or housing wall. In further embodiments a rotating divider 325 is used in conjunction with a fixed divider.

Figure 15:
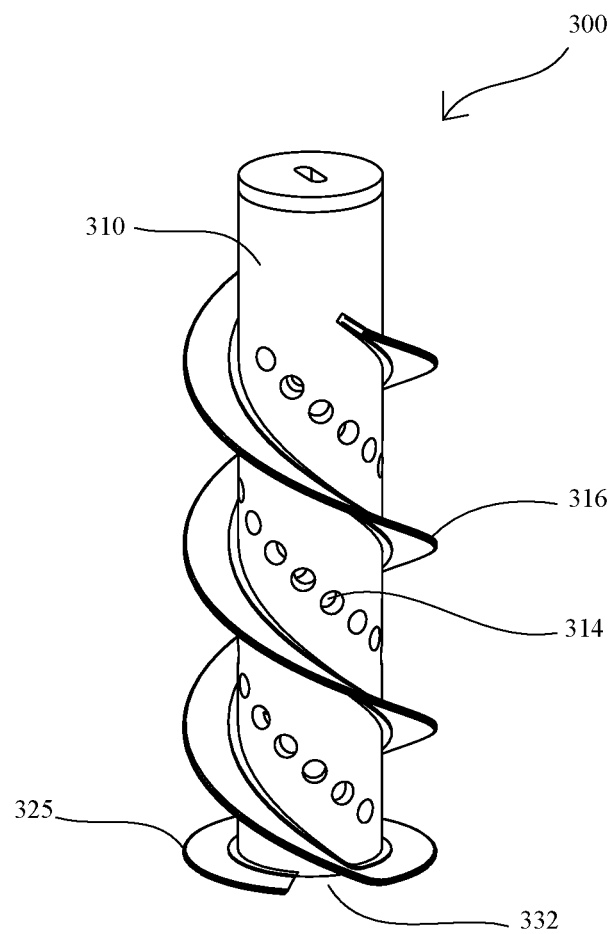
FIG. 15 is an embodiment of the cleaning assembly where the spiral wiper forms a divider which divides the collection region from the distribution region of the housing.

The divider may have one or more openings, generally located adjacent to the filter wall, which are configured to allow particles to easily enter the collection region 116, but to resist particles returning to the unfiltered distribution region 210. Depending on their form, the one or more openings may be fixed or rotating, or a combination of the two. The divider may consist of a flexible wiper like a brush or squeegee, or may take the form of a rigid structure; or a combination of flexible and rigid structures. In the embodiment illustrated in FIG. 15 the divider 325 is formed by a continuation of the cleaning wipers 316 and protrudes from the rotating distributor 310. The wiper wraps around the distributor 310 forming an external arc. An opening 332 is formed by ending the arc before the wiper wraps back around on itself or another wiper.

Cleaning Assembly—Operation

The cleaning assembly may be operated in one or more modes. In some embodiments the cleaning assembly is rotated at a single constant rate whenever a fluid pumping system is turned on. In other embodiments the cleaning assembly is rotated at one of multiple fixed rates depending on the level of filter fouling detected. Fouling of the filter material generally causes reduced flow and increased transmembrane pressure. This can be detected through pressure sensors, flow sensors and others sensors known to someone skilled in the art. By way of example, pressure sensors may take the form of a pressure switch which turns on when a set transmembrane pressure level has been reached. They may also take the form of an electronic pressure transducer which produces an electrical output proportional to the differential pressure across the filter material.

The rotational rate of the cleaning assembly may also be set to be proportional to the solids content of the influent. This can be accomplished using one or more sensors also known to someone skilled in the art, examples of which are turbidity sensors and suspended solids sensors. A still further mode would be to set the rotational rate proportional to the concentration of only those particles likely to cause fouling. This could be accomplished through the use of a particle counter on the influent or a combination of suspended solids sensors at the inlet and filtered outlet. Thus, the filter system may be configured to adjust the rotational speed of the cleaning assembly in response to a signal from one or more of a turbidity sensor, a suspended solids sensor and a particle counter.

The cleaning assembly may contain one or more wipers such that a single rotation of the cleaning assembly will wipe a section of filter material one or more times. The wipers may pass over a section of filter material from once per second up to 20 times per second, but each section of filter material could be wiped less or more often. By way of example, a cleaning assembly having 4 wipers and rotating at 150 RPM would wipe the filter 10 times per second.

Cleaning Assembly—Efficiency

With a surface filter such as those described herein, the retentive force on the pore-blocking particles is created by the transmembrane pressure acting on the area of the particles that is blocking the pore. Fouling may result when the retentive force on the particles is greater than the motive force imparted by the wiper. Different wiper designs will be more or less effective at cleaning particles of different make up. The effectiveness of the wiper can be characterized by a cleaning efficiency factor. The cleaning efficiency for a given wiper design is dependent, in part, on the pore width and transmembrane pressure. The cleaning efficiency generally remains substantially 100% until a critical pressure is reached at which time it quickly drops to 0% as pressure continues to increase. At or above the critical pressure, the wipers are not able to affect pore-blocking particles of ever increasing diameter. Operating beyond the critical transmembrane pressure creates a decaying flux curve, or in other words, the critical transmembrane pressure is the pressure above which the total filtrate rate drops over time. By way of example the critical pressure for a screen with 20 micron wide slots and nylon brushes with 0.006 inch diameter nylon filaments is approximately 3 psi and may be as little as 2 psi or even 1 psi. In one embodiment of the invention the filter system is operated continuously below the critical transmembrane pressure. In another embodiment the filter system operates above the critical pressure, but periodically drops below the critical pressure for a short period of time allowing the wiper to clean the filter. The critical pressure can be determined by monitoring filtration rates at various pressures over time and determining the pressure at which cleaning efficiency drops off to unacceptable levels.

Transmembrane Pressure Regulation

Operation of the filter system to control transmembrane pressure, for example to operate below the critical transmembrane pressure, can be accomplished in a number of ways. In some embodiments of the invention the filter system is supplied by a variable speed pump, which is controlled by drive electronics and a differential pressure transducer. The drive electronics change the speed of the pump impeller which varies the flow and pressure output of the pump in order to produce a relatively constant transmembrane pressure.

In other embodiments the filter system is supplied by a single speed pump and additional components are used to regulate the transmembrane pressure. An exemplary filter system along with additional fluid system components is represented schematically in FIG. 16. When the filter system is supplied by a single speed pump 512, the decreased flow of filter fouling causes an increase in the pressure supplied by the pump and subsequently an increased pressure at the unfiltered region of the housing.

Figure 16:
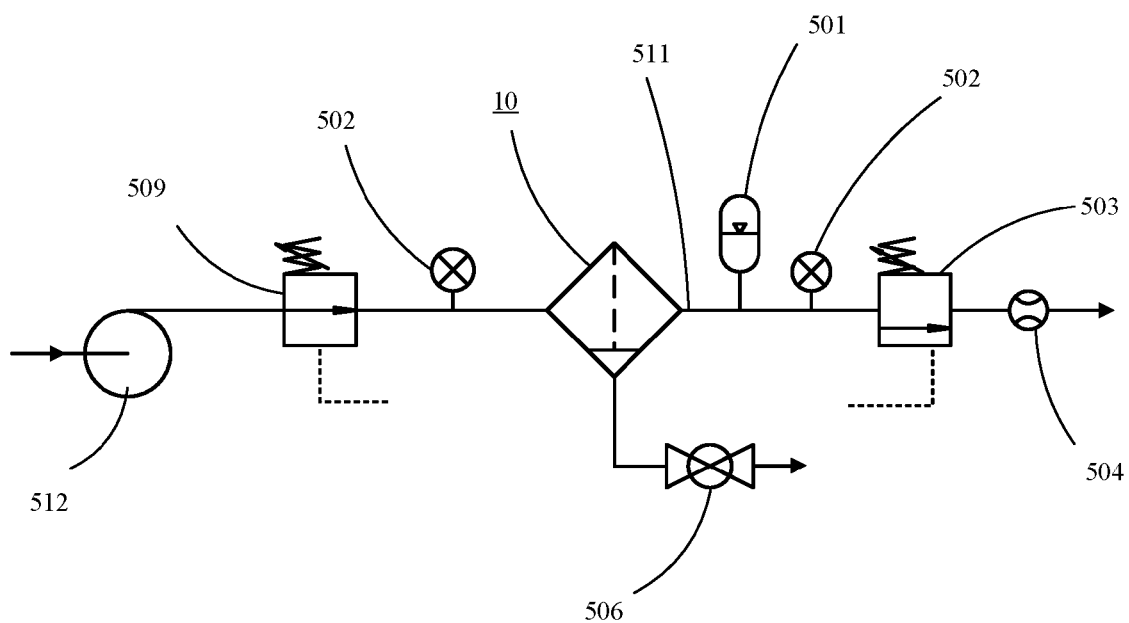
FIG. 16 is a schematic representation of a filter system with an arrangement of various fluid system components that may be used to operate the filter system.

Transmembrane pressure can be maintained by reducing the pressure in the unfiltered region of the housing or increasing pressure on the filtered region of the housing. In one embodiment of the invention flow is restricted at the inlet by a fluid system component 509 thus reducing the pressure at the unfiltered region, as illustrated in FIG. 16. This can be accomplished by a passive regulator, examples of which are pressure regulators and differential pressure regulators; or a flow control valve, examples of which are ball valves and butterfly valves. In another embodiment flow is restricted at the filtered outlet 511 by a fluid system component 503, thus increasing the pressure on the filtered region of the housing. This can be accomplished using a flow control valve or a passive regulator, examples of which are back pressure regulators and differential back pressure regulators.

In some embodiments the transmembrane pressure is maintained with the combination of a pressure regulator at the inlet and a back pressure regulator at the filtered outlet. In some embodiments a differential pack pressure regulator is located at the filtered outlet and a pressure regulator is not located at the inlet. In still other embodiments, a differential pressure regulator is located at the inlet and a back pressure regulator is located at the filtered outlet.

In some embodiments flow is increased at the drain outlet 506 using a flow control valve or a pressure release valve. The increased flow through the inlet lowers the pressure supplied by the pump and thus lowers the pressure on the unfiltered region of the housing. In even further embodiments flow restrictors at the outlet are used in conjunction with a pressure source to actively raise the pressure in the filtered region of the housing, thus reducing the pressure differential across the filter material In some embodiments a passive fluid and pressure reservoir 501 is located functionally between the filter material and any regulator 503 at the filtered outlet. This provides a reservoir to equalize the pressure and flow across the filter material when fouling occurs. This reservoir can take the form of an accumulator tank 501 or simply an air bubble trapped in the housing where it can communicate with the filtered region of the housing.

Drain Purge

Particles collected in the collection region may be purged from the housing by one or more methods. In some embodiments, the pump supplying the system is turned off and the drain valve is opened. The particles and fluid in the housing then simply drain out. This could be useful, for example, for swimming pools and other consumer applications where cost is an issue and routine maintenance is expected. In other embodiments the drain valve is fully opened while the pump continues running. This flushes the collection region while also causing a sudden drop in pressure in the unfiltered region of the housing. The drop in pressure can help to unclog any pores which might be retaining particles. When a pressure and fluid reservoir exists at the filtered outlet a small amount of fluid may flow backwards through the pores of the filter further helping to dislodge stuck particles. This passive back flush can be further aided by simultaneously closing a valve that is positioned at the filtered outlet after the pressure reservoir, such as valve 503 in FIG. 16.

In further embodiments the filter system is operated while the drain remains only slightly open. A small fraction of the fluid, generally in the range of 1% to 10%, passes out through the drain taking with it the rejected particles. A continuous drain of this nature is often called a bypass flow or a brine stream.

In even further embodiments the system is operated as a crossflow filter. In such a configuration a certain amount of flow passes out through the drain and creates a flow velocity tangential to the surface of the filter. This tangential flow acts as a cleaning mechanism which can work by itself or in conjunction with the wipers to reduce or eliminate fouling. In crossflow applications the bypass flow is optimally run at about 50% but can range from about 10% to 90%. In some embodiments the bypass flow makes a single pass through the filter system. In other embodiments the bypass flow is pumped back into the system and makes multiple passes through the filter.

It is also possible to purge particles from the system without substantially impacting the pressure or flow of the system. Some embodiments use a rotary valve located at the drain outlet. This type of valve has a valve element with one or more cavities which can be opened sequentially first to the collection region and then to the drain by the rotation of the valve element. A seal around the valve element maintains the pressure in the collection region. The rotary valve can be driven by a motor or by hand. In one embodiment the valve is coupled to the distributor and driven simultaneously. If coupled to the distributor it would generally be coupled through one or more gears to reduce the rotational speed of the valve with respect to the distributor. A typical gear ratio would be 1:100 but could be as low as 1:10,000 or as high as 1:1.

In one embodiment the valve is operated in a continuous fashion whenever the filter is in operation. In other embodiments one or more sensors or switches operates the valve. The valve can be operated by a timer; in response to filter fouling; or in response to solids accumulation in the collection region. Filter fouling can be indicated by an increased pressure differential or decreased flow which can be detected by pressure and flow sensors. Solids accumulation can be detected by a variety of sensors, examples of which are optical sensors and acoustic sensors. In one embodiment the valve is a separate unit attached to the drain outlet. In other embodiments the valve is integrated into the end or side wall of the housing.

CONCLUSION

In the foregoing specification, various exemplary embodiments have been described. It will, however, be evident that various modifications and changes may be made thereto without departing from the broader spirit and scope of the invention which will be set forth in the claims. The specification and drawings are, accordingly, to be regarded in an illustrative rather than a restrictive sense.

What is claimed is:

1. A method of filtering a fluid comprising:
    providing a filtration device comprising:
        a hollow housing comprising an inlet and filtered outlet;
        a hollow filter assembly located inside the housing and comprising a cylindrical filter with an interior surface and an exterior surface; and
        a rotating cleaning assembly located inside the filter assembly, wherein the cleaning assembly comprises a spiral shaped wiper;
    feeding a fluid through the inlet to the inside of the filter;
    passing the fluid through the filter, and
    wiping the interior surface of the filter by rotating the cleaning assembly from one to 20 times per second.

2. The method of claim 1, wherein the filter is wiped from 1 to 200 times per second.

3. The method of claim 2, wherein the filter is wiped from 2 to 40 times per second.

4. The method of claim 1, wherein the spiral shaped wiper is preloaded against the internal surface of the filter.

5. The method of claim 1, wherein the spiral shaped wiper does not touch the interior surface of the filter.

6. The method of claim 1, wherein the spiral shaped wiper comprises a brush, a squeegee or a scraper.

7. The method of claim 1, wherein the cleaning assembly comprises a distributor and the fluid is fed to the inside of the filter through the distributor.

8. The method of claim 1, wherein the cleaning assembly is rotated at one of multiple fixed rates depending on a detected level of filter fouling.

9. The method of claim 8, wherein the level of filter fouling is detected by a pressure sensor or flow sensor.

10. The method of claim 1, wherein the rotational rate of the cleaning assembly is set to be proportional to the solids content of the fluid.

11. The method of claim 10, wherein the solids content of the fluid is determined by a turbidity sensor or suspended solids sensor.

* * * * *